United States Patent [19]

Paalman et al.

[11] Patent Number: 4,500,500

[45] Date of Patent: Feb. 19, 1985

[54] SELECTIVE REMOVAL OF $H_2S$ FROM STEAM ALSO CONTAINING $CO_2$

[75] Inventors: H. Hunter Paalman, Walnut Creek; Denis Drapeau, San Francisco, both of Calif.

[73] Assignee: The Dow Chemical Company, Midland, Mich.

[21] Appl. No.: 516,025

[22] Filed: Jul. 22, 1983

[51] Int. Cl.³ .............................................. B01D 53/31
[52] U.S. Cl. ................................... 423/224; 423/232; 423/234
[58] Field of Search ............... 423/232, 234, DIG. 19, 423/224, 551

[56] References Cited

U.S. PATENT DOCUMENTS 2,747,962  5/1956  Heitz et al. ..................... 423/236 X
4,163,044  7/1979  Woertz ................................ 423/234

*Primary Examiner*—Earl C. Thomas
*Attorney, Agent, or Firm*—Robert R. Stringham

[57] ABSTRACT

Essentially all of the $H_2S$ in steam which also contains up to 30 ppmw of $CO_2$ per ppmw of $H_2S$ can be scrubbed from the steam with aqueous NaOH or $Na_2CO_3$ without consuming more than about 4 mols of NaOH or 2 mols of $Na_2CO_3$ per mol of $H_2S$ and without consuming more than about 0.18 pounds of water per pound of steam scrubbed, if (1) the steam is scrubbed countercurrently in a tower containing a contacting means equivalent to at least 6 theoretical stages, (2) the sulfide species in the tower effluent are completely oxidized to sulfo species and (3) the oxidized effluent—less a bleed stream and plus water and base makeup—is recycled to the tower. If the steam is scrubbed in this manner before being introduced to the turbines in a power plant, the exhaust from the turbines can be vented to the atmosphere without further treatment. The method of the invention is particularly suited for use at the Geysers geothermal "steam" field in California.

10 Claims, No Drawings

SELECTIVE REMOVAL OF H₂S FROM STEAM ALSO CONTAINING CO₂

BACKGROUND OF THE INVENTION

The largest complex of geothermal power plants in the world (950 megawatts) is operated on dry steam taken from the Geysers area in Northern California, U.S.A. This steam is produced under a pressure of 120 psia with superheat up to 10° F. and at a rate of about 17 million pounds per hour. The impurities present in the steam in significant amounts are listed in Table 1.

TABLE 1

| Contaminant | Amount (ppmw)[1] | |
| --- | --- | --- |
| | Average | Range |
| $CO_2$ | 3000 | 300–6000 |
| $H_2S$ | 220 | 70–570 |
| $NH_3$ | 100 | 10–330 |
| $CH_4$ | 200 | |
| $H_2$ | 50 | |
| $N_2$ | 50 | |
| $B$[2] | 20 | |

NOTES:
[1] Parts per million by weight.
[2] Predominantly as boric acid.

Although desirable, removal of all of the listed contaminants is not essential. However, the plant maintenance problem caused by boric acid-derived deposits on turbine blades would make boric acid removal, prior to power extraction from the steam, a very desirable treatment. This can be done effectively by water scrubbing. Some superheat is lost in the scrubbing operation but the benefit of also removing H₂S can be gained if an alkaline reagent is added to the liquid.

Unfortunately, only part of the H₂S is removed by known alkaline scrubbing procedures. The H₂S content of the scubbed steam is still high enough to require further treatment of plant effluent streams to avoid emission problems. That is, the turbine exhaust is condensed by heat exchange with cool water, the non-condensibles are vented and the condensate is sent to a cooling tower. This results in partial evaporation and cooling of the unevaporated portion of the condensate. Most of the the cooled portion is used as the cool water supply to the condenser (the rest—about 0.18 lbs. per lb. of steam supply—constitutes the available process water for the complex). Part of the H₂S is vented with the non-condensibles and the rest is flashed off in the evaporation step. The emitted H₂S is generally diluted to non-toxic levels by the prevailing winds but still causes an odor problem for down-wind communities. The problem is particularly acute when a power plant must be shut down and the steam "stacked", i.e., vented directly to the atmosphere without further treatment.

State and local governments have enacted regulations including timetables for the development of one or more treatment methods which are capable of abating the problem (but are not prohibitively expensive). The need for a really effective method of removing H₂S from geothermal steam is thus clear.

Conventional wisdom is to the effect that alkaline scrubbing cannot be made more effective because the absorption equilibrium for H₂S in aqueous sodium hydroxide is unfavorable at the temperature of the produced steam (*Geothermal Air Emission Characterization, Vol. II: Air Pollution Control Technology For Geothermal Power Plants;* pp. 49–51, K. T. Semrau et al, Stanford Research International, Menlo park, Calif. EPA Contract No. 68-03-2661. (October 1980)). There is also the consideration that even if all the H₂S could be removed by alkaline scrubbing, this would be at the additional cost of the caustic which would be consumed by the relatively large content of CO₂ in the steam. It is known (U.S. Pat. No. 2,747,962) that H₂S—even though more weakly acidic than CO₂—can be selectively removed from gaseous mixtures in a short-contact process which takes advantage of the fact that the rate of CO₂ uptake by aqueous NaOH is significantly slower than the rate of H₂S uptake. However, at temperatures substantially higher than ambient, the latter difference in rates becomes so small that the desired selectivity of alkaline scrubbing for H₂S is lost.

The most effective prior art, alkaline scrubbing process for removal of H₂S from steam known to the present Applicants is that disclosed in U.S. Pat. No. 4,163,044. This process apparently is the one which has been experimentally used to treat the incoming steam at the Geysers Unit No. 12 (primarily for removal of boric acid and dust). Further treatment of the steam (downstream of the turbine) by other methods—such as the well known Stretford process—is necessary to reduce H₂S emissions to a currently acceptable level.

In the process of the '044 patent, the incoming steam is counter-currently contacted in an absorption tower with an aqueous NaOH solution which already contains a relatively high amount of sulfide species, as well as sulfite and sulfate species. The sulfide content in the sulfide-loaded, liquid effluent from the tower is then reduced by oxidation. A bleed portion of the treated effluent is discarded and makeup water and NaOH are added to the remainder, which is then recirculated to the tower for another absorption cycle. The oxidation is carried out on the entire effluent stream or, preferably, on a portion of it, from which the bleed is taken before it is recombined with the rest of the effluent. The oxidant used is H₂O₂, the thermal instability of which necessitates cooling the effluent feed to the oxidizer (by heat exchange with the oxidized effluent stream exiting the oxidizer). The only indication in the patent as to how much of the H₂S can be removed by the disclosed process is the phrase " . . . thereby absorbing a significant portion of the hydrogen sulfide content of the steam, e.g., 50 percent, . . . ". Neither the extent of CO₂ uptake or the mols of NaOH consumed per mole of H₂S absorbed can be deduced from the data given.

Thus, the prior art gives no indication that substantially more than about 50% of the H₂S content of geothermal steam (which also contains substantial amounts of CO₂) can be removed by alkaline scrubbing. This is particularly so with regard to steam produced from the Geysers area, where only about 0.18 pound of process water per pound of steam is available.

OBJECTS OF THE INVENTION

The primary object of the present invention is to provide an environmentally acceptable method for removing from 90 to 100% of the H₂S from steam of the type produced from the Geysers area.

A further object is to provide such a process that can be operated with as little as 0.18 pound of water per pound of steam.

Another object is to accomplish selective removal of H₂S from steam which also contains up to 30 ppm of CO₂ per ppm of H₂S.

An additional object is to provide an alkaline scrubbing process for H$_2$S-laden steam in which either alkali metal hydroxides or carbonates (or mixtures thereof) can be employed.

It is also an object of the invention to provide an H$_2$S-scrubbing process which is simple and requires a relatively small capital investment.

A very important object is to upgrade an already familiar upstream scrubbing technology to the point where downstream treatment can be dispensed with and "stacking" of feed steam can be done without increasing H$_2$S emission from a geothermal power plant.

Still other objects will be made apparent to those knowledgeable in the art by the following specifications and claims.

SUMMARY OF THE INVENTION

It has now been discovered that it is feasible to remove H$_2$S, completely and with a high degree of selectivity, from steam which also contains up to 30 parts per million of CO$_2$ per ppm of H$_2$S, by alkaline scrubbing and oxidative regeneration of the scrub solution. Although the invention is not dependent on the correctness of the perception, the feasibility of the process is perceived as largely due to (1) fully exploiting the increase in the ratio of H$_2$S to CO$_2$ acid strengths (in water) as steam temperatures are increased above about 155° C., and (2) the greater than anticipated decrease in H$_2$S vapor pressure of the liquid feed to the tower when the proportion of the sulfides in the effluent from the tower which is not oxidized is reduced substantially below 50%.

The invention may be defined as an improvement in a known method of removing H$_2$S from a flow of steam which also contains up to 30 ppm (or more) of CO$_2$ per ppm of H$_2$S.

The known method comprises counter-currently contacting the steam flow with a sulfide-containing stream of an aqueous base, in which said base is an alkali metal hydroxide or carbonate and is present in a concentration equivalent to ~0.5 molal NaOH, in an absorption tower, thereby absorbing as much as about 50 percent of the H$_2$S in the aqueous base, then discharging the aqueous stream from the tower as a sulfide-loaded effluent. The effluent is treated with an oxidant, thereby converting a portion of the dissolved sulfide species to sulfite and/or sulfate species. A part of the oxidized effluent is discarded as a bleed, makeup water and base are added to the remainder of the effluent and the resultant mixture is recycled to the tower as the sulfide-containing stream of aqueous base.

If the scrubbing operation is carried out in a tower having contacting means equivalent to at least 6 equilibrium stages, the following improvement makes it possible to absorb essentially all of the H$_2$S from the steam without consuming more than 0.18 pound of water per pound of steam treated and without consuming more than about 4 mols of said hydroxide or about 2 mols of said carbonate per mol of H$_2$S removed.

The improvement is effected by:

(a) maintaining the base concentration in the liquid feed to the tower at a level substantially less than that equivalent to 0.5 molal NaOH but sufficient to establish a pH therein of at least 12, (b) operating the tower at a liquid to steam weight ratio of about 0.18 or more, under autogenous pressure and at a temperature sufficiently in excess of 155° C. so that the acid strength of the H$_2$S is at least about equal to that of the CO$_2$, and (c) employing the oxidant in an amount such that the proportion of the sulfide species in said effluent which are returned, unconverted, to the tower ranges from a maximum of about 7% when said liquid to steam weight ratio is 0.18 to a minimum of 0% when said ratio is about 0.6 or more.

The "liquid feed to the tower" in the preceding definition is considered to include the makeup water, whether mixed with the recycle stream outside of or inside of the tower.

DETAILED DESCRIPTION

The process of the invention is of course suitable for removal of H$_2$S from steam containing far less than 30 ppm of CO$_2$ per ppm of H$_2$S. In fact, the steam need not be geothermal steam and may be free of impurities other than H$_2$S. However, the present process is most advantageous when applied to geothermal steams, i.e., to steam having contents of the impurities listed in Table 1 within the ranges given there.

Alkali metal hydroxides and carbonates in general are suitable bases for the practice of the improved process but the sodium compounds are the least expensive and generally the most suitable. Among the latter, NaOH is preferred as to solubility, ease of handling and capital investment requirements and Na$_2$CO$_3$ is preferred as to chemical cost.

To simplify the present exposition, the discussion of bases henceforth will be largely limited to NaOH; it is to be understood, however, that equivalent solutions of Na$_2$CO$_3$ or of other alkali metal hydroxides, etc., are contemplated throughout unless specifically excluded.

The NaOH used is preferably received at the power plant as 50% aqueous NaOH which is diluted on-site to the desired molality for the liquid feed to the tower at start-up or for makeup base thereafter.

The water available (as "blowdown") at the Geysers of course is not pure but contains only those contaminants present in the incoming steam and is considered quite suitable for the preparation of start-up and makeup solutions.

Generally suitable oxidants for use in the present process are those which do not result in excessive pH lowering in the liquid recycle to the tower and which are reactive with H$_2$S, NaHS and Na$_2$S in basic, aqueous solution. Hydrogen peroxide, although proven feasible, is expensive and requires a substantial capital investment in heat exchange equipment of the type disclosed in the earlier-cited U.S. Pat. No. 4,163,044. Chlorine is much cheaper but requires the use of additional base for pH maintenance and results in formation of corrosive NaCl solutions. The oxidant of choice appears to be oxygen itself (the oxygen content of air is too low for volume-efficient operation). The best mode of carrying out the oxidation presently known is to contact the hot sulfide solution with oxygen gas in contact with a bed of solid nickel particles and in the presence of ppm concentrations of dissolved nickel. This mode of oxidation is a separate invention in its own right, was not invented by the present applicants and is not claimed per se in this application; it is subsequently described herein, in some detail.

The parameters which are manipulated in the process of the invention are the liquid to gas ratio in the scrubbing tower, the proportion of the oxidized effluent removed as the bleed, the mols of base in the recycle stream per mol of $H_2S$ in the steam and the mols of oxidant employed per mol of sulfide species in the liquid effluent from the tower. The relative proportions of makeup base added before and after the oxidation can also be varied, depending on the pH required in the oxidizer and the bleed rate.

The type, spacing and number of trays in a given scrubbing tower of course cannot be changed, once the tower is fabricated. However, both tower design and process operations require an understanding of the dependency of the system equilibria on the preceding parameters and on quantity, composition and temperature of the steam to be treated. This dependency is set out (for NaOH as the base) in the following relationship:

$$[Na^+] = \left(\frac{P(H_2S)[S^=]\gamma(S^=)K_1(H_2S)}{H(H_2S)K_2(H_2S)\gamma^2(HS^-)}\right)^{\frac{1}{2}} + 2[S^=] + \left(\frac{H(H_2S)\gamma(S^=)[S^=]}{K_1(H_2S)K_2(H_2S)P(H_2S)}\right)^{\frac{1}{2}} \frac{P(CO_2)K_1(CO_2)}{H(CO_2)\gamma(HCO_3^-)} + 2\frac{H(H_2S)K_1(CO_2)K_2(CO_2)\gamma(S^=)P(CO_2)[S^=]}{H(CO_2)K_1(H_2S)K_2(H_2S)\gamma(CO_3^=)P(H_2S)} + \frac{Kw}{\gamma(OH^-)}\left(\frac{H(H_2S)[S^=]\gamma(S^=)}{K_1(H_2S)K_2(H_2S)P(H_2S)}\right)^{\frac{1}{2}} - \left(\frac{P(H_2S)K_1(H_2S)K_2(H_2S)}{H(H_2S)[S^=]\gamma(S^=)}\right)^{\frac{1}{2}} \frac{1}{\gamma(H^+)} + 2[SO_4^=].$$

(A)

where:
$\gamma$ (i) is the activity coefficient of the component (i),
P (i) is the partial pressure of i,
H (i) is the Henry's Law constant for i,
[i] is the molality of i,
$K_1$ (i), $K_2$ (i) are the first and second dissociation constants of i, and
Kw is the dissociation constant for water.

The foregoing equation (A) is a theoretical model which describes the several vapor-liquid equilibria and ionic species distribution of the $H_2O/NaOH/H_2S/CO_2$ system. It was algebraically derived from the following eight equations, which assume ideal gas and non-ideal solution behaviors and take into account the oxidized sulfide species (assumed to be $Na_2SO_4$) present when the liquid feed to the tower is a recycle stream. Equations (1) and (2) are the Henry's Law relationships for $H_2S$ and $CO_2$; (3) through (7) are the equilibrium acid dissociation equations for $CO_2/H_2CO_3$ (aq.), $H_2S$ (aq.) and $H_2O$ and (8) is the charge balance for the aqueous ionic species.

It should be noted that the expression $[CO_2^*]$ used in equations (2) and (5) denotes the sum of $[CO_2(aq.)]$ and $[H_2CO_3]$, according to conventional practice, in recognition of the inherent difficulty of distinction between the latter two species. The distribution of these species at temperatures above 70° C. was not found in the literature but since the $[CO_2(aq.)]/H_2CO_3$ ratio at 70° is 600 to 1 (and on the basis of other considerations) $[CO_2^*]$ was taken as equivalent to $[CO_2(aq.)]$.

Equations (1)-(8):

$$P(H_2S) = H(H_2S)[H_2S] \quad (1)$$

$$P(CO_2) = H(CO_2)[CO_2^*] \quad (2)$$

The first and second acid dissociation relations for $H_2S$ and $CO_2$ are given in equations (3) thru (6)

$$[H_2S] = \frac{[H^+]\gamma(H^+)[HS^-]\gamma(HS^-)}{K_1(H_2S)} \quad (3)$$

$$[HS^-] = \frac{[H^+]\gamma(H^+)[S^=]\gamma(S^=)}{\gamma(HS^-)K_2(H_2S)} \quad (4)$$

$$[CO_2^*] = \frac{[H^+]\gamma(H^+)[HCO^-]\gamma(HCO_3^-)}{K_1(CO_2)} \quad (5)$$

$$[HCO_3^-] = \frac{[H^+]\gamma(H^+)[CO_3^=]\gamma(CO_3^=)}{\gamma(HCO_3^-)K_2(CO_2)} \quad (6)$$

The dissociation equation for water is:

$$Kw = [H^+]\gamma(H^+)[OH^-]\gamma(OH^-) \quad (7)$$
assuming activity of $H_2O = 1$ The charge balance for the aqueous species is:

$$[Na^+] = [HS^-] + 2[S^=] + [HCO_3^-] + 2[CO_3^=] + [OH^-] - [H^+] + 2[SO_4^=]. \quad (8)$$

It will be seen that in order to make use of Equation A the values of the following quantities at the steam temperature must first be known: H ($H_2S$) and H ($CO_2$); $\gamma(H^+)$, $\gamma(OH^-)$, $\gamma(HS^-)$, $\gamma(S^=)$, $\gamma(CO_3^=)$ and $\gamma(HCO_3^-)$; Kw, $K_1(H_2S)$, $K_2(H_2S)$, $K_1(CO_2)$ and $K_2(CO_2)$.

The values given in the literature by five different authors for $K_1$ and $K_2$ for $H_2S$ and $CO_2$ differ substantially, as do even the values given (by three authors) for Kw. See Table 2, following.

TABLE 2

| Ranges of Dissociation Constants in Literature for $H_2S$, $CO_2$ and $H_2O$ at 170° C. | |
|---|---|
| Constant | Range |
| $K_1(H_2S)$ | $1.13 \times 10^{-7}$ to $2.61 \times 10^{-7}$ |
| $K_2(H_2S)$ | $6.25 \times 10^{-14}$ to $9.77 \times 10^{-11}$ |
| $K_1(CO_2)$ | $1.12 \times 10^{-7}$ to $1.37 \times 10^{-7}$ |
| $K_2(CO_2)$ | $3.04 \times 10^{-11}$ to $3.58 \times 10^{-11}$ |
| Kw | $3.09 \times 10^{-12}$ to $3.47 \times 10^{-12}$ |

Since the reasons for the discrepancies in the literature K values were not apparent, the set of values published by Naumov (Naumov, G. B. et al., "*Handbook of Thermodynamic Data*", translated from Russian to English; U.S. Geological Survey, Water Resources Division, January 1974, PB 226 722) were selected as yielding the most conservative calculated results: $K_1(H_2S) = 1.77 \times 10^{-7}$, $K_2(H_2S) = 8.13 \times 10^{-12}$, $K_1(CO_2) = 1.37 \times 10^{-7}$, $K_2(CO_2) = 3.36 \times 10^{-11}$ and $Kw = 3.09 \times 10^{-12}$. (It will be noted that $K_1$ for $H_2S$ is larger than $K_1$ for $CO_2$; that is, at 170° C., $H_2S$ is more acidic than $CO_2$.)

Expressions for the Henry's Law constants for $H_2S$ and $CO_2$ were obtained by reducing to linear equations the data given by Ellis et al (Ellis, A. J. and Mahon, W.

A. J., "Chemistry and Geothermal Systems", Academic Press, New York, 1977, pp. 126–134) for Henry's Law Constants as a function of temperature and ionic strength (I, $=\frac{1}{2}\Sigma m_i z_i^2$; $m_i$=molality of component i and $z_i$=charge of ionic species i). With I as the independent variable and at a temperature of 170° C., the equations for the constants, in units of atmospheres per mole per 1000 grams of solution, are $$H(H_2S) = 0.39I + 34.3 \tag{9}$$

$$H(CO_2) = 21.5I + 115.7. \tag{10}$$

The $z_i$ and $m_i$ values needed to calculate I are of course determined by the composition of the liquid at a given point, which in turn depends on the liquid to gas ratio, the choice of NaOH or $Na_2CO_3$ as the base, the bleed rate, the % oxidation of sulfides, the input and output contents of $H_2S$ and $CO_2$ and the Henry's Law and dissociation constants. I values are given in Table 6, subsequently herein.

The activity coefficients ($\gamma$'s) for $H^+$, $HS^-$, $OH^-$, $CO_3^=$, $S^=$ and $HCO_3^-$ were estimated by means of an extended version of the semi-empirical equation developed by Debye and Huckel to relate electrostatic effects and "single ion activity coefficients":

$$\log \gamma(i) = \frac{-Az^2\sqrt{I}}{1 + Ba\sqrt{I}} + bI \tag{11}$$

wherein $\gamma(i)$, z and I are as above defined, a is an "ion-size parameter", b is an adjustable parameter which allows for the effect of the decrease in the mole fraction of the solvent in concentrated solutions and A and B are parameters which vary with temperature and the dielectric constant of the solvent. The appropriate values of the parameter "a" for each ion (except $SO_4^=$, assumed completely dissociated) were taken from Table 2 at pages 46 and 47 of "*Wateq, A Computer Program for Calculating Chemical Equilibria of Natural Waters*", Truesdell, A. H. and Jones, B. F.; U.S. Department of Interior, Geologic Survey, May, 1973 PB 220 464. Parameter b was taken as zero for all ions of concern.

| Ion: | $H^+$ | $OH^-$ | $HS^-$ | $S^=$ | $HCO_3^-$ | $CO_3^=$ |
|---|---|---|---|---|---|---|
| a: | 9.0 | 3.5 | 3.5 | 5.0 | 5.4 | 5.4 |

The values (at 170° C.) of A and B (also from Naumov, Table V-3, page 290) were taken as A=0.736 and B=0.358.

The following sets of values of the activity coefficients at 170° C. were calculated according to equation (11), using the minimum, maximum and average values of I given in Table 6.

TABLE 3

| | Activity Coefficient | | |
|---|---|---|---|
| Ion | At Minimum Value I | At Maximum Value I | At Average Value I |
| $H^+$ | 0.725 | 0.649 | 0.674 |

TABLE 3-continued

| | Activity Coefficient | | |
|---|---|---|---|
| Ion | At Minimum Value I | At Maximum Value I | At Average Value I |
| $OH^-$ | 0.597 | 0.419 | 0.482 |
| $HS^-$ | 0.597 | 0.419 | 0.482 |
| $S^=$ | 0.170 | 0.065 | 0.093 |
| $HCO_3^-$ | 0.653 | 0.525 | 0.568 |
| $CO_3^=$ | 0.181 | 0.076 | 0.104 |

Given the necessary constants, as above determined, Equation A is then employed in the following manner to characterize the vapor-liquid equilibria and ionic species distribution throughout the (countercurrently operated) absorption tower.

Assuming a vertical tower with liquid downflow and steam upflow through a succession of N horizontal trays, the liquid leaving each tray is assumed to be in equilibrium with the gas (steam) leaving the tray. Constant liquid and vapor flow rates, i.e., no net condensation or evaporation, are assumed. For computation, the partial pressure of $H_2S$ in the steam leaving the top tray (tray 1) is arbitrarily set according to the applicable emission regulations and the partial pressure of $CO_2$ in the exiting steam is initially estimated as an "educated guess". Equation A is then solvable for [$S^=$] (the concentration of sulfide ion in the liquid leaving tray 1) by iteration (successive trial and error calculations). The concentrations of the rest of the ionic species are back-calculated using the foregoing equations (1)–(8).

The liquid streams flowing onto trays 1 and 2 and the steam flow exiting tray 1 are then fully characterized and the partial pressures of $H_2S$ and $CO_2$ in the steam exiting tray 2 are calculated using mass balances around the tray 1. With the compositions of the liquid flow to and the steam flow from tray 2 now "known", the calculation can be repeated to determine the compositions of the liquid flow to and the steam flow from tray 3.

Following this procedure, species distributions and partial pressures are calculated tray to tray, from column top to column bottom, until the $H_2S$ concentration in the input steam, $P(H_2S)_N$ at some tray #N is comparable to that of the steam to be scrubbed. If a check of the corresponding input $CO_2$ partial pressure, $P(CO_2)_N$, does not agree with actual steam compositions, a new $P(CO_2)$ is assumed in equilibrium with the top tray and the calculations are repeated. The iterations continue until the input partial pressures of $CO_2$ and $H_2S$ correspond to the actual steam composition.

Because actual steam compositions vary significantly with time and well location, the choice of a stopping point in the calculation is somewhat arbitrary. This aspect of the scrubbing operation was examined by assuming single pass scrubbing ([$SO_4^=$]=0) and ideal solution behavior (all activity coefficients equal to unity). The set of results so obtained are given in Table 4 and indicate that after 8 theoretical stages the scrub liquor is approaching equilibrium with the incoming steam and more stages will not result in significant increases in $H_2S$ absorption. It would also appear that effective scrubbing is feasible when the contacting means is equivalent to as few as 6 theoretical stages.

TABLE 4

Calculated Percents of H₂S and CO₂ Absorbed vs. Number of Stages in Single Pass, Caustic Scrubbing at 170° C.; Ideal Gas and Solution Behavior Assumed

| No. of Stages | H₂S in Steam | | | | CO₂ in Steam | | | |
|---|---|---|---|---|---|---|---|---|
| | Input ppmw | Output ppmw | Absorbed ppmw | Absorbed %/w | Input ppmw | Output ppmw | Absorbed ppmw | Absorbed %/w |
| 2 | 85 | 12 | 73 | 85.88 | 2524 | 2184 | 340 | 13.50 |
| 4 | 187 | 12 | 175 | 93.58 | 2438 | 2184 | 254 | 10.42 |
| 6 | 250 | 12 | 238 | 95.20 | 2384 | 2184 | 200 | 8.39 |
| 8 | 283 | 12 | 271 | 95.76 | 2355 | 2184 | 171 | 7.26 |
| 10 | 301 | 12 | 289 | 96.01 | 2344 | 2184 | 160 | 6.83 |
| 12 | 303 | 12 | 291 | 96.04 | 2341 | 2184 | 157 | 6.70 |

Assuming non-ideal solution behavior and single-pass scrubbing with 1% NaOH in 8 theoretical stages, the amounts of $H_2S$ and $CO_2$ the incoming steam could contain without exceeding a stipulated $H_2S$ output were calculated for four successively higher final $CO_2$ contents, at each of two different stipulated $H_2S$ outputs. The results are given in Table 5.

If the latter values fall on or below the appropriate curve, the stipulated maximum $H_2S$ emission level will be met; otherwise, not.

Equation A was utilized to assess scrubbing performance in an 8-stage tower, assuming recycle of oxidized liquid effluent (−bleed, +makeup) at different oxidation levels, liquid/gas ratios, bleed rates, water input

TABLE 5

MAXIMUM INITIAL H₂S CONTENT VS INITIAL CO₂ CONTENT AND MAXIMUM FINAL H₂S CONTENT
Single Pass Operation ([SO₄⁼] = 0)
Non-ideal Solution Behavior (Calc. Activity Coefficients Used)

| Stipulated H₂S Output | 41 g/GMWH | | | | 100 g/GMWH | | | | 200 g/GMWH | | | |
|---|---|---|---|---|---|---|---|---|---|---|---|---|
| Final ppmw CO₂ | 36 | 1456 | 2184 | 3266 | 36 | 1456 | 2184 | 3266 | 36 | 1456 | 2184 | 3266 |
| Initial ppmw CO₂ | 583 | 2433 | 3367 | 4600 | 500 | 2300 | 3300 | 4600 | 566 | 2133 | 3133 | 4500 |
| Maximum initial ppmw H₂S | 1060 | 280 | 117 | 47 | 1126 | 467 | 23 | 107 | 1093 | 627 | 373 | 194 |

If the data points in Table 5 are plotted, smooth curves can readily be drawn through them. Such curves may be utilized as boundary lines between input steam compositions which will and will not result in acceptable $H_2S$ outputs. That is, parameters such as output $CO_2$ concentrations, liquid to gas ratio in the tower and the caustic content in the liquid feed to the tower may be varied and the $H_2S$ output concentration calculated.

rates and $CO_2$ contents in the incoming steam. The input and output $H_2S$ concentrations were held constant in the calculations so that comparisons could be made at the same level of $H_2S$ absorption.

The same calculations were carried out for the use of $Na_2CO_3$, rather than NaOH, as the base.

The data for both alkaline reagents are given in Table 6.

TABLE 6

CALCULATED PERFORMANCE OF 8-STAGE SCRUBBING TOWER
H₂S & CO₂ IN STEAM

| | ppmw | |
|---|---|---|
| | Input | Output |
| H₂S | 221 | 12 |
| CO₂ | Calculated* | 3200 |

| L/G (lb/lb) | Base | Solution Bleed Rate (lb/hr) × 10⁻³ | % Oxidation of Sulfides | Total NaOH or Na₂CO₃ (lb/hr)³ × 10⁻³ Dry Basis | Ionic Strength $I = \Sigma^i m_i Z_i^2$ Molality | Make Up Water (lb/hr) × 10⁻³ | * Input CO₂ ppmw |
|---|---|---|---|---|---|---|---|
| .600 | NaOH | 90 | 100 | 0.657 | 0.245 | 88.0 | 3325 |
| | | 60 | 100 | 0.602 | 0.361 | 58.1 | 3297 |
| | | 30 | 100 | 0.550 | 0.659 | 28.3 | 3239 |
| | | 12 | 100 | 0.523 | 1.450 | 10.3 | 3211 |
| .180 | NaOH | 90 | 100 | 1.371 | 0.466 | 86.0 | 3841 |
| | | 60 | 100 | 1.059 | 0.565 | 56.9 | 3612 |
| | | 30 | 100 | 0.780 | 0.904 | 27.6 | 3383 |
| | | 12 | 100 | 0.627 | 2.003 | 10.1 | 3297 |
| .180 | NaOH | 90 | 93 | 1.555 | 0.539 | 85.5 | 3956 |
| | | 60 | 95 | 1.163 | 0.630 | 56.6 | 3669 |
| | | 30 | 96 | 0.828 | 0.972 | 27.5 | 3440 |
| | | 12 | 97 | 0.644 | 2.060 | 10.0 | 3297 |
| .600 | Na₂CO₃ | 90 | 100 | 0.843 | 0.241 | 85.3 | 3096 |
| | | 60 | 100 | 0.783 | 0.358 | 55.6 | 3067 |
| | | 30 | 100 | 0.720 | 0.673 | 25.9 | 3067 |
| | | 12 | 100 | 0.686 | 1.421 | 8.1 | 3067 |

TABLE 6-continued
CALCULATED PERFORMANCE OF 8-STAGE SCRUBBING TOWER

H$_2$S & CO$_2$ IN STEAM

| | ppmw | |
|---|---|---|
| | Input | Output |
| H$_2$S | 221 | 12 |
| CO$_2$ | Calculated* | 3200 |

| L/G (lb/lb) | Base | Solution Bleed Rate (lb/hr) × 10$^{-3}$ | % Oxidation of of Sulfides | Total NaOH or Na$_2$CO$_3$ (lb/hr)$^3$ × 10$^{-3}$ Dry Basis | Ionic Strength I = Σ$^i$ m$_i$Z$_i^2$ Molality | Make Up Water (lb/hr) × 10$^{-3}$ | * Input CO$_2$ ppmw |
|---|---|---|---|---|---|---|---|
| .180 | Na$_2$CO$_3$ | 90 | 100 | 1.565 | 0.397 | 81.6 | 3153 |
| | | 60 | 100 | 1.270 | 0.508 | 53.1 | 3125 |
| | | 30 | 100 | 0.980 | 0.856 | 24.6 | 3067 |
| | | 12 | 100 | 0.808 | 1.920 | 7.5 | 3039 |
| .180 | Na$_2$CO$_3$ | 90 | 93 | 1.739 | 0.448 | 80.7 | 3182 |
| | | 60 | 95 | 1.372 | 0.557 | 52.6 | 3125 |
| | | 30 | 96 | 1.032 | 0.918 | 24.3 | 3067 |
| | | 12 | 97 | 0.826 | 1.966 | 7.4 | 3039 |

Basis: 1 × 10$^6$ lb/hr Steam, 55 MW
NOTE:
The lbs/hr of bleed exceeds the sum of O$_2$ input (2 mols per mol H$_2$S absorbed), the CO$_2$ and H$_2$S absorbed and the lbs/hr of makeup water because the base is added as a solution (50% NaOH or 23% Na$_2$CO$_3$), the water content of which is not included in the lbs/hr of makeup water.

It will be seen from the Table that:

(1) Substantially lower base consumption but somewhat higher water consumption and a lower maximum CO$_2$ input are indicated when operating at a higher L/G ratio.

(2) Use of Na$_2$CO$_3$ as the base reduces the amount of CO$_2$ which can be in the incoming steam (i.e., some of the CO$_2$ in the treated steam comes from the Na$_2$CO$_3$).

(3) Both base and water consumption rates go down as the bleed rate is reduced, but so does the maximum CO$_2$ input.

(4) The stipulated H$_2$S removal can be attained at a percent oxidation as low as 93% and the CO$_2$ input can be somewhat higher but the base consumption is substantially higher than at 100% oxidation.

Actual tests to determine equilibrium vapor pressures of H$_2$S and CO$_2$ over basic, aqueous solutions with Na$^+$ concentrations of from 0.1 to 1.5 molar were carried out in a pilot plant designed to investigate an alternative method of scrubbing (brief liquid/gas contact in co-current flow) which proved to be of little value at a temperature (173° C.) typical of Geysers geothermal steam.

It was found that for solutions with [Na$^+$] around 1.5 molar, CO$_2$ and H$_2$S vapor pressures were found to be 2.6 and 2.5 times what would be predicted for ideal solution behavior. For solutions with [Na$^+$] between 0.1 and 0.3 molar, CO$_2$ vapor pressures were as predicted for ideal solution behavior but H$_2$S vapor pressures were only 0.64 of the predicted values.

Considerably better agreement with the experimental values was obtained by use of Equation A (which assumes non-ideal solution behavior). This is shown in Table 7 (for [Na$^+$] = 1.5–1.7 molar), in terms of equilibrium concentrations in the liquid and gas phases.

TABLE 7
CALCULATED AND MEASURED EQUILIBRIUM CONCENTRATIONS

| | | Run A | | | Run B | | | Run C | | |
|---|---|---|---|---|---|---|---|---|---|---|
| Component | Concentration | Calc. | Actual | Δ % | Calc. | Actual | Δ % | Calc. | Actual | Δ % |
| Na$^+$ | Mols/liter in liquid | 1.498 | 1.498 | — | 1.543 | 1.543 | — | 1.725 | 1.725 | — |
| HS$^-$ + S$^=$ | Mols/liter in liquid | 0.0638 | 0.0554 | +15.2 | 0.0499 | 0.0515 | −3.1 | 0.1278 | 0.0981 | +30.3 |
| HCO$_3^-$ + CO$_3^=$ | Mols/liter in liquid | 0.7513 | 0.7068 | +6.3 | 0.7844 | 0.7035 | +11.5 | 0.8023 | 0.7959 | +0.8 |
| H$_2$S Input | PPMW* in Steam | 119 | 138 | −13.6 | 48.5 | 72 | −32.6 | 434 | 371 | +16.9 |
| CO$_2$ Input | PPMW* in Steam | 3417 | 3040 | +12.4 | 3512 | 3030 | +15.9 | 2843 | 2940 | −3.3 |

*Parts Per Million by Weight.

It will be seen that the agreement between the actual and calculated values in Table 7 is reasonably good. The extents to which the discrepancies are due to the inherent experimental/analytical difficulties and to deficiencies of theory cannot be stated.

The preferred contacting means for the scrubbing operation is a plurality of vertically spaced, horizontal sieve trays. This type of tray is preferred due to low installation costs, well established design procedures, low fouling tendency, capacity equal to or better than for other type trays and good efficiency (with proper design). Other types of trays are suitable but impose higher pressure drops (steam enthalpy losses) and are more prone to malfunction. Various flowthrough packings may also be suitable but are more limited as to design procedures for scale-up and have a greater potential for non-uniform liquid distributions.

The number of trays required per tower probably will not exceed 16—the figure arrived at simply by assuming 8 theoretical stages and a conservatively estimated tray efficiency of 50%.

Based on the data in the preceding Table 5 and employing the tower design procedure published by Fractionation Research, Inc., "*Fractionation Tray Design*", Vol. 2, Section 5.1, p. 4, July 13, 1979, a requirement of two columns, 14 feet in diameter and with a tray spacing of 30" is arrived at for scrubbing of one million pounds per hour of steam having a composition within the range given in Table 1 herein. The following equation (11) was used to calculate the column diameter (assuming sieve trays):

$$D_t = \left( \frac{6.8(V\text{ Load}) + 10(L\text{ Load})}{Ts^{\frac{1}{2}}} \right)^{\frac{1}{2}} \tag{11}$$

where: $D_t$ = column diameter, ft.

$V$ Load = ft$^3$/sec vapor $\times \left( \frac{\rho_V}{\rho_L - \rho_V} \right)^{\frac{1}{2}}$ $L$ Load = ft$^3$/sec liquid
$Ts$ = tray spacing
$\rho$ = density.

A single, 22 foot diameter tower or three 12 foot diameter towers could as well be used but fabrication, transport and cost considerations favor the use of two, 14 foot diameter towers. With allowance for demistors at the tops of the towers, a tower height of 60 feet is appropriate.

OXIDATION

The best mode presently contemplated for the practice of the present invention includes carrying out the oxidation step by passing the entire liquid effluent stream from the scrubbing tower through a reactor containing a nickel packing and an essentially stagnant body of gas consisting predominantly of oxygen. The partial pressure of oxygen in the gas phase—which is the continuous phase in the reactor—is maintained essentially constant. The only mixing of the gas and liquid phases is that resulting from the downflow of the liquid through the gas-filled voids in the packing. The packing functions not only as a gas/liquid contacting means but also supplies, as a corrosion product, trace amounts of dissolved nickel species which, together with the nickel packing surface, provides the catalysis essential to an economic oxidation rate.

A laboratory scale demonstration of the latter oxidation method was carried out in a system including a reactor, a first heat exchanger for heating the incoming sulfide-containing liquid feed to the reactor and another exchanger for cooling the oxidized solution exiting the reactor. The liquid feed was a synthetic "tower effluent" consisting of 800.66 grams of 25% aq. NaOH, 1001.42 grams Na$_2$S 9H$_2$O, 3408.00 grams Na$_2$SO$_4$, 209.88 grams of Na$_2$CO$_3$, 943.60 grams NaHCO$_3$ and 855.0 pounds (387,828 grams) of water.

The feed was pumped at a rate of about 0.267 liters/minute) through the first heat exchanger (neither exchanger would be required when oxidizing and recycling an actual scrubbing tower effluent), where it was heated by 80 psig steam; it was then introduced at the top of the reactor—a 3 foot, vertically disposed section of schedule 40 steel pipe lined with polytetrafluoroethylene, closed with 316 stainless steel flanges and packed (~87% void space) to a depth of 1 foot with nickel PRO-PAK (Trademark of Scientific Development Co.) metal distillation packing; see U.S. Pat. No. 2,602,651. The reactor was traced with 80 psig steam and insulated, for temperature control. The liquid level in the reactor was controlled at about 5 inches with a differential pressure controller and a control valve; the liquid temperature was about 147° C. and the liquid residence time in the reactor was about 3.2 minutes.

Oxygen was introduced near the bottom of the reactor, through a rotameter but at such a low rate that the reading (about 0.131 liters/minute at 1 atm. and 20° C.) had to be estimated; this was equivalent to 1.9 gram moles of O$_2$ per gram mole of sulfide introduced to the reactor.

10 ml samples of the entering and exiting liquid streams were analyzed with an Orion., sulfide-specific electrode, Model 94-16, and an Orion double junction reference electrode, Model 90-02. Each sample is mixed with 5 ml of AAR (alkaline anti-oxidant reagent), diluted to 25 ml with distilled water and analyzed with the two electrodes—which generate a millivolt range reading. The reading is compared with calibration data correlated (by using a convenient means, such as a Hewlett-Packard-41C calculator) from the points obtained from three successively smaller, standard samples (10 ml, 5 ml and 1 ml). Essentially complete oxidation was indicated by the analyses made during operation of the system.

All process tubing used was 316 stainless steel.

MATERIALS OF CONSTRUCTION

The literature on corrosion in geothermal power plant systems is extensive but does not identify universally suitable materials of construction. That is, the compositions of steams from different fields differ and must be evaluated individually. Broadly, however, suitable materials for the practice of the present invention are otherwise appropriate materials resistant to aqueous, alkaline solutions of carbonates, sulfides and sulfates at temperatures typical for geothermal steam. Concern must also be had for the possible inclusion of other detrimental components, such as chlorides and dissolved oxygen.

The best source of information on corrosion behavior of geothermal fluids at the Geysers field is found in "*Materials, Selection Guidelines for Geothermal Energy Utilization Systems*", Ellis and Conover; U.S. Dept. of Energy, January 1981; Contract No. DE-ACO2-79ET27026. On the basis of the latter information, steel clad with AISI 316 is considered the material of choice for the scrubbing column(s) and for the pumps, piping and other ancillary equipment required.

What is claimed is:

1. An improvement in a known method of removing H$_2$S from a flow of steam which also contains up to 30 ppm of CO$_2$ per ppm of said H$_2$S, said method comprising counter-currently contacting the steam flow with a sulfide-containing stream of an aqueous base, in which said base is an alkali metal hydroxide or carbonate and is present in a concentration equivalent to about 0.5 molar NaOH, in an absorption tower, thereby absorbing as much as about 50 percent of the H$_2$S in the aqueous base; discharging the aqueous stream from the tower as a sulfide-loaded effluent, treating the effluent with an oxidant, thereby converting a portion of the dissolved sulfide species to sulfite and/or sulfate species; discarding a part of the oxidized effluent as a bleed, adding makeup water and base to the remainder of the effluent and recycling the resultant mixture to the tower as said sulfide-containing stream of aqueous base;

said improvement making it possible, when the contacting means in said tower is equivalent to at least 6 equilibrium stages, to absorb essentially all of the $H_2S$ from the steam without consuming more than about 0.18 pound of makeup water per pound of steam treated and without consuming more than about 4 mols of said hydroxide or about 2 mols of said carbonate per mol of said $H_2S$ removed, and said improvement being effected by:
- (a) maintaining the base concentration in the liquid feed to the tower at a level substantially less than that equivalent to 0.5 molal NaOH but sufficient to maintain a pH therein of at least 12,
- (b) operating the tower at liquid to steam weight ratio of about 0.18 or more, under autogenous pressure and at a temperature sufficiently in excess of 155° C. so that the acid strength of the $H_2S$ is at least about equal to that of the $CO_2$, and
- (c) employing said oxidant in an amount such that the proportion of the sulfide species in the effluent which are returned, unconverted, to the tower ranges from a maximum of about 7% when said liquid to steam weight ratio is 0.18 to a minimum of 0% when said weight ratio is about 0.6 or more.

2. The improved method of claim 1 wherein the concentration of said base in said liquid feed is equivalent to from about 0.01 to about 0.3 molal NaOH.

3. The method of claim 2 wherein said base is NaOH or $Na_2CO_3$.

4. The method of claim 3 wherein said liquid to gas weight ratio is in the range of from about 0.18 to about 0.6.

5. The method of claim 4 wherein said base is NaOH.

6. The improved method of claim 1 wherein said contacting means is a plurality of vertically spaced apart sieve trays.

7. The method of claim 6 wherein said means is equivalent to 8 equilibrium stages.

8. The method of claim 7 wherein said base is NaOH.

9. The method of claim 8 wherein said liquid to gas weight ratio is in the range of from about 0.18 to about 0.6.

10. The method of claim 7 wherein said base is $Na_2CO_3$ and said liquid to gas weight ratio is in the range of from about 0.18 to about 0.6.

* * * * *

UNITED STATES PATENT AND TRADEMARK OFFICE
CERTIFICATE OF CORRECTION

PATENT NO. : 4,500,500
DATED : Feb. 19, 1985
INVENTOR(S) : H. Hunter Paalman and Denis Drapeau It is certified that error appears in the above—identified patent and that said Letters Patent is hereby corrected as shown below:

In the Abstract, line 7, after the word "if" a colon should be placed: -- if: --;

Column 1, line 37, delete "scubbed" and insert -- scrubbed --;
   line 68, "Park" should be capitalized;

Column 5, line 35, after the period, add -- (A) --;

Column 8, line 39, delete "the" at the beginning of the sentence;

Column 9, Table 5, under the heading "100 g/GMWH" delete "23" in the last line and insert -- 233 --.

Signed and Sealed this

Thirteenth Day of August 1985

[SEAL]

Attest:

DONALD J. QUIGG

*Attesting Officer*     *Acting Commissioner of Patents and Trademarks*